United States Patent [19]

Rathje et al.

[11] 4,394,886
[45] * Jul. 26, 1983

[54] STEERING GEAR WITH STEERING-ARM LEVER

[75] Inventors: Uwe Rathje; Manfred Lappe, both of Dortmund, Fed. Rep. of Germany

[73] Assignee: O&K Orenstein & Koppel Aktiengesellschaft, Berlin, Fed. Rep. of Germany

[*] Notice: The portion of the term of this patent subsequent to Apr. 22, 1997, has been disclaimed.

[21] Appl. No.: 116,358

[22] Filed: Jan. 28, 1980

[30] Foreign Application Priority Data

Jan. 26, 1979 [DE] Fed. Rep. of Germany ....... 2902927

[51] Int. Cl.³ ............................................. B62D 5/08
[52] U.S. Cl. .................................. 180/140; 180/6.58; 180/135; 180/329
[58] Field of Search .............. 180/132, 135, 140, 6.58, 180/327, 329, 331

[56] References Cited

U.S. PATENT DOCUMENTS

| | | | |
|---|---|---|---|
| 3,202,238 | 8/1965 | Strader | 180/140 |
| 3,724,585 | 4/1973 | Conrad | 180/140 |
| 3,856,102 | 12/1974 | Queen | 180/140 |
| 4,016,948 | 4/1977 | Kuester | 180/132 |
| 4,140,199 | 2/1979 | Lester | 180/140 |

Primary Examiner—Joseph F. Peters, Jr.
Assistant Examiner—Donn McGiehan
Attorney, Agent, or Firm—Martin A. Farber

[57] ABSTRACT

A steering gear with pitmans arm, steering tie rod and steering gear connecting rod for a vehicle with optionally hydraulically boosted, mechanical steering or purely hydraulic steering, and a hydraulic pump, driven by the drive engine, being connected via conduits and a flow regulating- and pressure limiting-valve to a directional control valve from which, on the one hand a line extends to a steering mechanism which is actuated from the steering gear via a cardan shaft and from which lines extend to a two-directional control valve which is connected with the hydraulic cylinders of the front axle and, on the other hand a line extends to a steering valve which is actuated by means of the steering gear and the cardan shaft, oil under pressure flowing either through a line to the directional valve connected with the cylinders for the front axle or through a line to the directional valve connected with the rear axle. The pressure oil is pumped by the pump over the first mentioned directional control valve to the connecton of the steering valve, and depending upon the turning of the steering wheel, via a line and one control valve to the piston-side chamber of one rear axle hydraulic cylinder and to the piston-rod-side chamber of the other rear axle hydraulic cylinder, or the pressure oil flows from the steering valve via another line to another control valve and further via still another line over said one control valve to the piston-rod-side chamber of the one hydraulic cylinder and to the piston-side chamber of the other hydraulic cylinder.

4 Claims, 2 Drawing Figures

STEERING GEAR WITH STEERING-ARM LEVER

The present invention relates to a steering gear with pitman arm, drag link and tie rod for a vehicle which is movable on wheels on and off the highway and has optionally hydraulically boosted, mechanical steering or purely hydraulic steering actuated by means of hydraulic cylinders and solenoid valves, the conversion of the hydraulically boosted system into the purely hydraulically operating system being effected by optionally connecting a cardan shaft, which is connected to the steering wheel, with one of the two systems serving to actuate the steering, a hydraulic pump, driven by the drive engine and acting on both systems, being connected via conduits and a flow-regulating and pressure-limiting valve to a directional control valve from which, on the one hand, a conduit extends to a steering mechanism which is actuated from the steering gear via the cardan shaft and from which conduits extend to a two-directional control valve which is connected with the hydraulic cylinders of the front axle and, on the other hand, a conduit extends to a steering valve which is actuated by means of the steering gear and the cardan shaft, oil under pressure flowing either through a conduit to the directional valve connected with the cylinders for the front axle or through a conduit to the directional valve connected to the rear axle, in accordance with our copending U.S. patent application Ser. No. 951,872 filed Oct. 16, 1978, now U.S. Pat. No. 4,199,038.

The object of the prior application has the disadvantage that when the driver upon the operation of the vehicle wants to steer with view over the rear axle as, for instance, is the case after swinging the driver's cab by 180° or after swinging the upper chassis with the crane house stationary, i.e., when the rear axle is towards the front in the direction of travel, the driver of the vehicle must realize that upon turning the steering wheel the wheels of the rear axle turn in the direction opposite the rotation of the steering wheel so that if the steering wheel is turned to the left one travels over a right-hand curve and vice versa. This uncustomary response to the turning of the steering wheel requires great concentration on the part of the operator, and there is the danger that accidents and damage may occur as a result of improper response to obstacles which present themselves.

The object of the present invention is to avoid the disadvantage of the known arrangement and so to improve the steering system that the vehicle can be steered in customary manner even in the event that the rear axle is towards the front in the direction of travel, i.e., that upon turning the steering wheel to the left one travels over a left-hand curve and vice versa.

This objective is achieved in accordance with the invention in the manner that the pressure oil flows from the pump over a directional control valve present in switch position "b" to the connection of the steering valve, and depending upon the turning of the steering wheel, which steering valve is connected positively with the steering wheel and the steering column by the cardan shaft, either via a conduit and the directional control valve which is in switch position "b" to the piston-side chamber in the one hydraulic cylinder which actuates the rear-axle steering and to the piston-rod-side chamber in the other hydraulic cylinder which actuates the rear-axle steering, or that the pressure oil flows from the pump-side connection to the outlet connection of the steering valve and from there via a conduit to the directional control valve present in switch position "a" and, further, via a conduit, over the directional control valve which is in switch position "b" to the piston-rod-side space of the one hydraulic cylinder and to the piston-side space of the other hydraulic cylinder.

The advantage is that in a vehicle provided with the steering gear of the invention, when the driver of the vehicle must steer the vehicle with the rear axle, the steering wheel turns produce wheel turns in the same direction.

One embodiment of the invention is shown by way of example in the drawing, in which.

Figure 1:
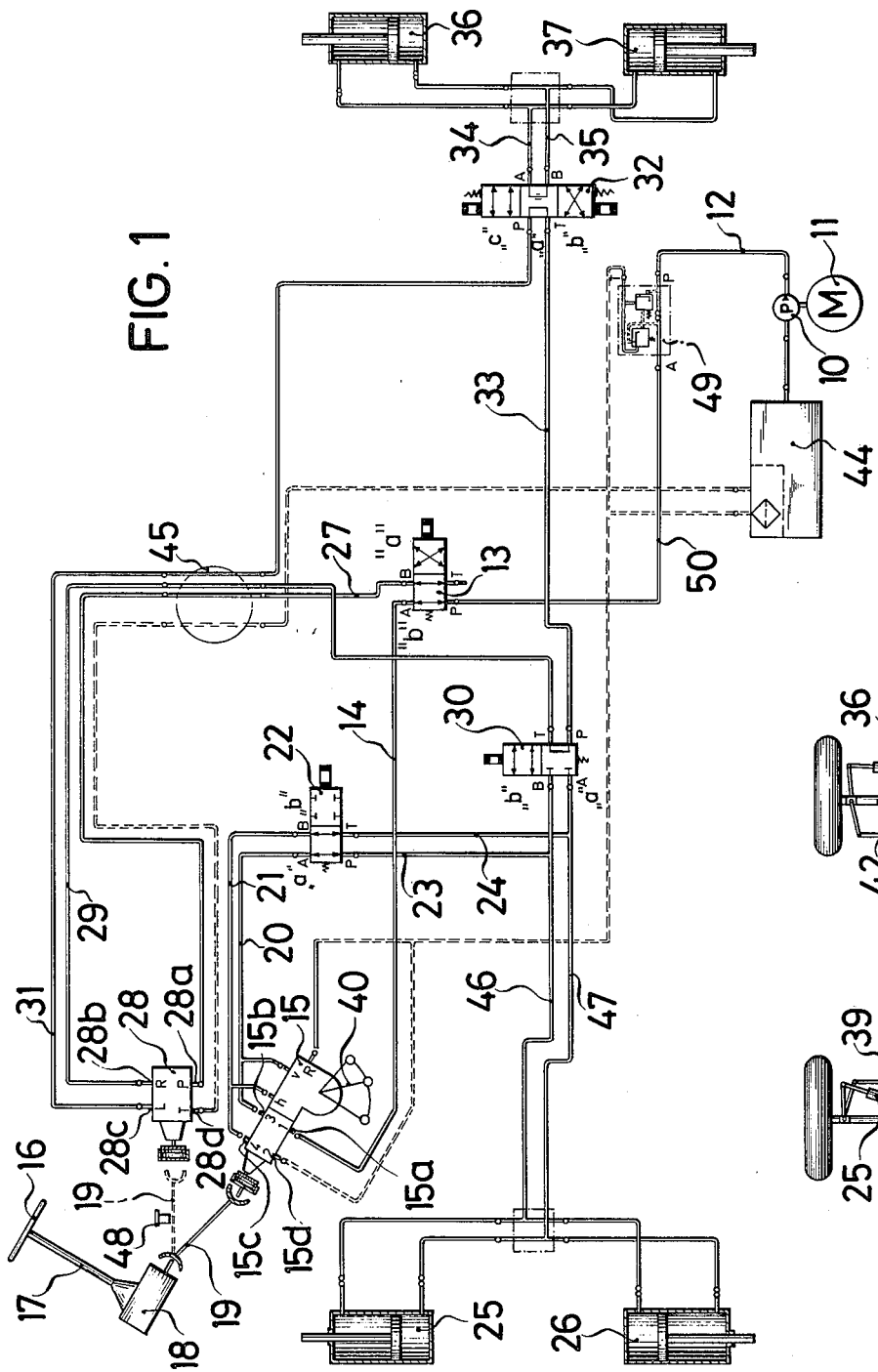
FIG. 1 is a circuit diagram of the hydraulic circuit of the steering gear.
Figure 2:
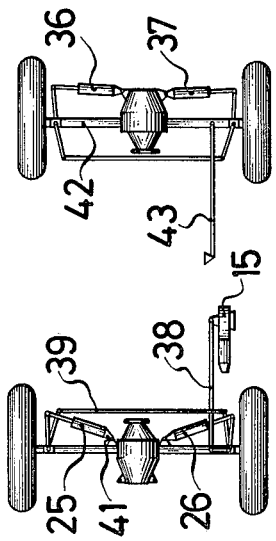
FIG. 2 is a diagrammatic top view of a vehicle steered with the gear of FIG. 1.

For the mechanical actuating of the steering with hydraulic boosting, pressure oil flows from a hydraulic pump 10, which is driven by an engine 11, via a conduit 12, a flow-regulating and pressure-limiting valve 49 and a conduit 50, to a directional control valve 13 which is in position "a" and, from there, via a conduit 14, to a steering mechanism 15 which is actuated by steering wheel 16, steering column 17, angle drive 18 and cardan shaft 19. From the steering mechanism 15, conduits 20 and 21 extend to a directional control valve 22 which is connected via conduits 23 and 24 and via further conduits 46 and 47 with hydraulic cylinders 25 and 26 of the front axle 41 of the vehicle. When the steering gear is to be actuated purely hydraulically, the cardan shaft 19 is disconnected from the steering mechanism 15 and connected with a steering valve 28. The oil pumped by the hydraulic pump 10 now flows through the conduit 12, a flow-regulating and pressure-limiting valve 49 and a conduit 50 to the directional control valve 13 which is automatically displaced into position "b" and through a conduit 27 to the steering valve 28, which is actuated by means of the steering gear 16, 17, 18 and the cardan shaft 19. From the steering valve 28, oil under pressure is conducted via a conduit 29 to the directional control valve 30 which is in position "b" and via a conduit 46 to the hydraulic cylinders 25 and 26 of the front axle 41 or via a conduit 31 to the directional control valve 32 which is in position "a" and a conduit 33, the directional control valve 30 and a conduit 47 to the hydraulic cylinders 25 and 26 of the front axle 41. When the rear-axle steering is connected, pressure oil is conducted from the steering valve 28 either via a conduit 29 to the directional control valve 30 and via a conduit 46 to the hydraulic cylinders 25 and 26 of the front axle 41 and via the conduit 47, the directional control valve 30, the conduit 33, the directional control valve 32 which is in position "c" and a conduit 34 or 35 to the hydraulic cylinders 36 and 37 of the rear axle 42, or else via the conduit 31, the directional control valve 32 and the conduit 34 or 35 to the hydraulic cylinders 36 and 37 of the rear axle 42 and furthermore via the conduit 35 or 34 to the directional control valve 32 via the conduit 33, the directional control valve 30 and the conduit 47 to the hydraulic cylinders 25 and 26 of the front axle 41. As follows from FIG. 2 and the above remarks, the front wheels of the front axle 41 of a rubber-tire vehicle can be steered mechanically with hydraulic boosting or else, via the steering valve 28, purely hydraulically by means of the drag link 38 and the tie-rod 39 from the steering mechanism 15.

The manner of operation is as follows:

For highway travel the steering wheel 16 is connected via the steering column 17, the angle drive 18 and the cardan shaft 19 to the steering mechanism 15; by means of the pitman arm 40 the movement of the steering wheel 16 is transmitted mechanically to the front axle 41. Via the control valve arranged in the steering mechanism 15, the hydraulic boosting of the steering is effected in correspondence to the movements of the steerng wheel 16, due to the fact that the pressure oil pumped by the hydraulic pump 10 is fed via the control valve 22 which is in position "a" as described above to the hydraulic cylinders 25 and 26. The rear axle 42 is mechanically locked by the lock rod 43 upon highway travel, and via the directional control valve 32 which is switched into position "a" both hydraulic cylinders 36 and 37 of the rear axle 42 are also contained in a separate closed hydraulic circuit. The directional control valves 13, 22 and 30 and 32 are automatically switched into switch position "a" by a solenoid 48. When the steering wheel 16 is not moved, the pressure oil pumped by the hydraulic pump 10 flows via connections 15a and 15d of the steering mechanism 15 to the tank 44. Upon the turning of the steering wheel 16, the pressure oil pumped by the hydraulic pump 10 flows from the connection 15a of the steering mechanism 15 via connection 15b or 15c to the hydraulic cylinders 25 and 26 of the front axle 41.

In case of purely hydraulic steering, the cardan shaft 19 is disconnected from its connection with the steering mechanism 15 and mechanically coupled to the steering valve 28. If only the front axle 41 is to be steered, the control valves 13, 22 and 30 are automatically placed by the solenoid 48 in switch position "b" while the directional control valve 32 is in switch position "a". Upon the turning of the steering wheel 16, the pressure oil pumped by the hydraulic pump 10 flows from the connection 28a of the steering valve 28 via the connection 28b or 28c to the hydraulic cylinders 25 and 26 of the front axle 41, as described above. If the steering wheel 16 is not turned, pressure oil flows from the hydraulic pump 10 via a swivel joint 45 to the steering valve 28, from the connection 28a to connection 28d and back to the tank 44 via the swivel joint 45. In order to obtain oppositely directed steering of the front axle 41 and the rear axle 42 and thus the smallest possible turning radius, the directional control valve 32 is switched by a solenoid into switch position "c". The directional control valves 13, 22 and 30 remain in switch position "b". In order to obtain the turning in the same direction of the wheels of the front axle 41 and of the rear axle 42, the directional control valve 32 is manually switched into switch postion "b". The directional control valves 13, 22 and 30 automatically remain in switch position "b".

When the cardan shaft 19 approaches the solenoid 48 as is the case when the cardan shaft 19 is connected with the steering valve 28, the directional control valves 30, 22 and 13 are automatically switched into the positions necessary for front-axle steering. The switching for rear-axle steering for travel with the rear axle towards the front is effected by means of solenoid 48, the directional control valve 30 being then switched from position "b" into position "a" and the directional control valve 32 from position "a" into position "b". In this way, the front axle is hydraulically locked and the rear axle is electropneumatically unlocked.

We claim:

1. A steering gear with pitmans arm, steering tie rod and steering gear connecting rod for a vehicle which is drivable on the road and in terrain on wheels, with a steering mechanism which is actuated selectively hydraulically supported mechanically or purely hydraulically by means of hydraulic cylinders and electromagnetic valves, and a universal shaft which is connected with the steering wheel changing from the hydraulically supported system over to the purely hydraulically operating system by selectively connecting said universal shaft with one of two systems which serve the actuation of the steering mechanism, wherein in combination one of said systems comprises a steering transmission and the other of said systems includes a steering valve, said steering transmission and said steering valve being selectively actuated by said steering gear by selective connection with said universal shaft, respectively, said hydraulic cylinders include hydraulic cylinders of a front axle and hydraulic cylinders of a rear axle of the vehicle, further comprising
   a hydraulic pump operatively connected to both of said systems,
   motor means for driving said pump,
   a plurality of control valves,
   a flow control- and pressure limit-valve,
   first conduits and said flow control- and pressure limit-valve connecting said pump to a first of said control valves,
   a first line being connected to said first control valve and to said steering transmission,
   second lines are connected to said steering transmission and to a second of said control valves, said second control valve constituting a two-way control valve,
   third lines connecting said second control valve operatively with said hydraulic cylinders of the front axle of the vehicle,
   a fourth line being connected to said first control valve and to said steering valve,
   a fifth line being connected to said steering valve and a third of said control valves,
   a sixth line being connected to said hydraulic cylinders of the front axle,
   a seventh line being connected to said steering valve and to a fourth of said control valves,
   an eighth line being connected to said third and fourth control valves,
   a ninth line being connected to said third control valve and to said hydraulic cylinders of the front axle,
   two tenth lines connecting said fourth control valve with said hydraulic cylinders of the rear axle,
   said hydraulic cylinders of said rear axle including pistons and piston rods connected thereto, each of said hydraulic cylinders in cooperation with said pistons defining a piston-side chamber and a piston-rod-side chamber,
   one of said tenth lines connects to said piston-side chamber of one of said hydraulic cylinders of the rear axle and to the piston-rod-side chamber of the other of said hydraulic cylinders of the rear axle and the other of said tenth lines connects to the piston-rod-side chamber of said one of said hydraulic cylinders of the rear axle and to the piston-side-chamber of the other of said hydraulic cylinders of the rear axle,
   a first selective operative pressurized oil flow path comprising in order: said first conduits and said flow control- and pressure limit-valve to said first control valve, said fourth line, said steering valve, said fifth line connecting to said third control valve, said third control valve, said eighth line, said fourth control valve and said another of said tenth lines connecting to the piston-rod-side chamber of said one of said hydraulic cylinders of the rear axle and to the piston-side chamber of the other of said hydraulic cylinders of the rear axle, a second selective operative pressurized oil flow path comprising in order: said first conduits and said flow control- and pressure limit-valve to said first control valve, said fourth line, said steering valve, said seventh line connecting to said fourth control valve, said fourth control valve, said one of said tenth lines connecting to the piston-side chamber of said one of said hydraulic cylinders of the rear axle and to the piston-rod-side chamber of the other of said hydraulic cylinders of the rear axle, said steering wheel, said steering column and said universal shaft constituting means for selecting one of said first and second selective operative pressurized oil flow paths, respectively, depending on the turning of said steering wheel, other selective operative pressurized oil flow paths through selective of said lines and selective of said control valves to said hydraulic cylinders of said front axle, and respectively, to said hydraulic cylinders of said rear axle, said control valves being selectively switched such that any one of said selective operative pressurized oil flow paths is operative with flow of pressurized oil therethrough.

2. A steering gear with pitmans arm, steering tie rod and steering gear connecting rod for a vehicle which is drivable on the road and in terrain on wheels, with a steering mechanism which is actuated at least purely hydraulically by means of hydraulic cylinders and electromagnetic valves, and a universal shaft which is connectable with the steering wheel and to the purely hydraulically operating system by connecting said universal shaft with a system which serves the actuation of the steering mechanism, wherein in combination said system includes a steering valve, said steering valve being selectively actuated by connection with said universal shaft, said hydraulic cylinders include hydraulic cylinders of a front axle and hydraulic cylinders of a rear axle of the vehicle, further comprising a hydraulic pump operatively connected to said system,
motor means for driving said pump,
a plurality of control valves,
conduit means for connecting said pump to a first of said control valves,
a fourth line being connected to said first control valve and to said steering valve,
a fifth line being connected to said steering valve and a third of said control valves,
sixth lines being connected to said hydraulic cylinders of the front axle and to said third control valve,
a seventh line being connected to said steering valve and to a fourth of said control valves,
an eighth line being connected to said third and fourth control valves,
two tenth lines connecting said fourth control valve with said hydraulic cylinders of the rear axle, said hydraulic cylinders of said rear axle including pistons and piston rods connected thereto, each of said hydraulic cylinders in cooperation with said pistons defining a piston-side chamber and a piston-rod-side chamber, one of said tenth lines connects to said piston-side chamber of one of said hydraulic cylinders of the rear axle and to the piston-rod-side chamber of the other of said hydraulic cylinders of the rear axle and the other of said tenth lines connects to the piston-rod-side chamber of said one of said hydraulic cylinders of the rear axle and to the piston-side-chamber of the other of said hydraulic cylinders of the rear axle, a first selective operative pressurized oil flow path comprising in order: said conduit means to said first control valve, said fourth line, said steering valve, said fifth line connecting to said third control valve, said third control valve, said eighth line, said fourth control valve and said another of said tenth lines connecting to the piston-rod-side chamber of said one of said hydraulic cylinders of the rear axle and to the piston-side chamber of the other of said hydraulic cylinders of the rear axle, a second selective operative pressurized oil flow path comprising in order: said conduit means to said first control valve, said fourth line, said steering valve, said seventh line connecting to said fourth control valve, said fourth control valve, said one of said tenth lines connecting to the piston-side chamber of said one of said hydraulic cylinders of the rear axle and to the piston-rod-side chamber of the other of said hydraulic cylinders of the rear axle, said steering wheel, said steering column and said universal shaft constituting means for selecting one of said first and second selective operative pressurized oil flow paths, respectively, depending on the turning of said steering wheel, other selective operative pressurized oil flow paths through selective of said lines and selective of said control valves to said hydraulic cylinders of said front axle, and respectively, to said hydraulic cylinders of said rear axle, said control valves being selectively switched such that any one of said selective operative pressurized oil flow paths is operative with flow of pressurized oil therethrough.

3. The steering gear as set forth in claim 1 or 2, wherein
said pistons and associated of said piston rods of said hydraulic cylinders, respectively, of said rear axle are substantially axially aligned and arranged in mirror image to each other, but operatively move simultaneously in substantially the same direction.

4. The steering gear as set forth in claim 1 or 2, wherein
said fourth control valve has reversing flowthrough paths connected to said seventh and eighth lines in a switching position thereof during an operative condition of said first and second selective operative pressurized oil flow paths, respectively, whereby when said steering wheel is turned in each direction said pistons are moved in substantially the same respective direction when said rear axle is forward with respect to a front moving direction of the vehicle.

* * * * *